March 14, 1950  M. VOSSELER ET AL  2,500,588
GOLF BAG CARRIER

Filed July 24, 1948  2 Sheets-Sheet 1

INVENTOR:
Max Vosseler
Karl Stay
BY:
Harold F. Scriber
ATTORNEY:

Patented Mar. 14, 1950

2,500,588

UNITED STATES PATENT OFFICE 2,500,588

GOLF BAG CARRIER

Max Vosseler, Roselle Park, and Karl Starz, Elizabeth, N. J., assignors to George Wuerthner, Linden, N. J.

Application July 24, 1948, Serial No. 40,513

9 Claims. (Cl. 280—36)

This invention relates to mobile luggage carriers and is concerned more particularly with a collapsible carrier for use primarily by the golfer in transporting a bag of golf clubs around the course.

A first aim of the invention is to provide a wheeled carrier for this purpose that is exceptionally light in weight so as to require a minimum of effort on the part of the golfer in transporting his clubs from place to place on the golf course.

A further aim of the invention is to render available a combination carrier cart and stand that will enable the golfer or his caddy not only to transport with ease a heavy bag of clubs but which will provide a sturdy stand of convenient height for holding the bag of clubs upright when the occasion for obtaining or changing clubs is at hand.

Still another objective of the invention is to provide a sturdy carrier for a bag of golf clubs that may be collapsed into a relatively small space whereby to render handling for carrying or storing in cars, luggage compartments, or lockers, a simple matter, and at the same time a carrier that may be readily extended to its normal useful size in but a moment's time.

The invention further aims to provide a wheeled carrier of simple yet attractive design, embodying relatively few and easy to manufacture parts, preferably of rust resistant materials, and one that is sturdily built and well able to stand the rugged terrain of the golf course.

In obtaining the objectives of this invention it is proposed to construct the carrier with a base member to which a pair of wheels, preferably rubber tired, and also one or more foldable leg standards are mounted. The sides of the carrier are conveniently comprised of two lazy-tong lattice sections which in their extended position are self-sustaining and which in their collapsed position are of a length not more than the width span of the base plate. The upper ends of the side sections, and preferably at one or more places medially of the extended height, are connected on one side by bow shaped members that hold the sides parallel and provide a back support for the bag of golf clubs. The bag is held from falling out of the opposite side by one or more buckle straps appropriately spaced. The straps not only secure the bag to the carrier but also provide a convenient medium for lashing one or more garments, towels, etc., to the vehicle. The upper cross-bow member is arranged to form a support for an adjustable handle by means of which the carrier may be wheeled about by either pulling or pushing.

In normal use the collapsed cart is taken from the car or locker and extended to its normal height. The carrier is equipped with foldable legs that are then swung into effective position and the golf bag strapped in place. The wheels are of such size and their disposition with relation to mass such that the carrier may be drawn up or down steps and over rough ground, through sand traps, etc., with comparative ease and facility.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which—

Figure 1 of the drawing is a perspective view of the carrier of this invention showing in dotted lines a representative golf bag in position.

Fig. 4 is a fragment detail view of the construction of the lazy-tong side sections at its juncture with the base.

Fig. 5 is a fragment detail view of a preferred form of means for applying automatic tension to the pivots of the arms of the lazy-tong members whereby they become self-sustaining in all positions.

Fig. 6 is an enlarged view of portions of the upper bow frame and the handle.

Figure 1:
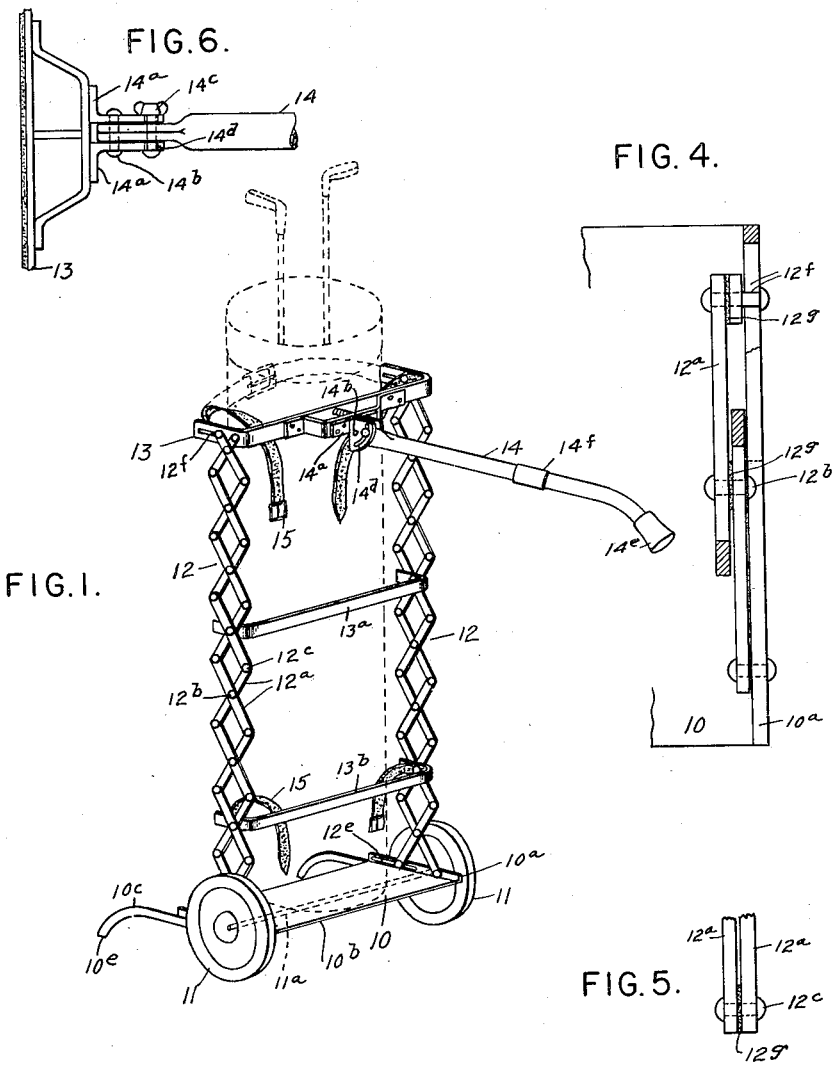

Referring more particularly to Fig. 1, the carrier of this invention is illustrated as having essentially, a rectangular bottom or base member 10, to which a pair of wheels 11 are attached, and upwardly extending side members 12 that are joined in spaced relation at their tops by a cross-bow 13. A draft type of handle 14 is adjustably pivoted to the cross-bow 13, and straps 15 are provided for securing the golf bag to the carrier.

Figure 2:
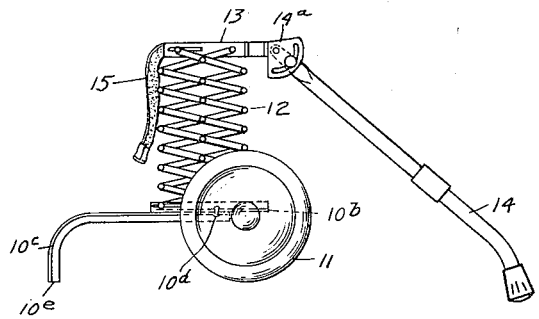
Fig. 2 is a side view of the carrier in partially collapsed condition.
Figure 3:
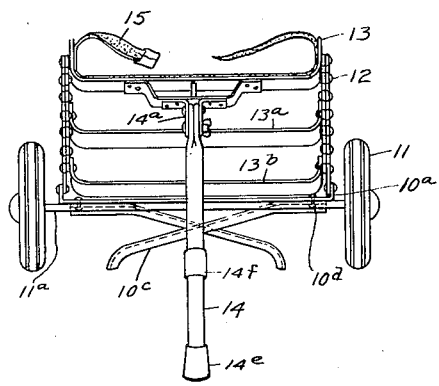
Fig. 3 is a front view of the carrier in partially collapsed condition.

The base 10 is constructed preferably of sheet aluminum or other light weight rust resisting material, and is formed with an upturned side flange 10a along each side. The underside of the base has the wheel axle 11a secured thereto, as by riveting, a short distance back from the front longitudinal edge 10b thereof. The periphery of the wheels, with their axes so disposed, is thereby caused to extend beyond the leading edge of the shelf-like base 10 and movement of the carrier over rough surfaces, curbings, steps, etc. is quite easily accomplished. To the rear of the axle 11a, a pair of leg standards 10c are pivoted in spaced relation as at 10d. As illustrated in Fig. 2, the leg standards, when opened out, extend to the rear and their turned-down feet 10e are adapted to engage the surface of the ground, so that the carrier and its bag of clubs will and can be left standing upright. When wheeling the carrier around it is proposed to fold the legs in under the base 10, as depicted in Fig. 3, but they may, if desired, be left extended, for in normal wheeling of the cart the cart is tipped forward slightly and the legs clear the ground.

For lightness, sturdiness, and attractiveness each side frame member 12 is composed of pairs of cross arms 12a, each pair being pivoted together at their centers 12b, and at their ends 12c to the ends of adjacent bars. In the instant exemplification, eight such pairs of cross-arms are utilized in a side, and together form a grill or lattice-like side wall for the carrier. The upper and lower pairs of cross arms have their forward legs fixedly pivoted respectively to the base and upper cross-bow members, and their rear legs slidingly pivoted to the said members as by the pin and slot connections indicated in 12e and 12f respectively. Between the faces of each two pivoted cross-arms 12a, centers and ends, and between the faces of the end cross-arms and the face of the base flange 10a and cross bow 13, it is proposed to install a friction washer 12g, preferably made of fibre which is designed to afford sufficient resistance to relative turning or sliding of the parts as to maintain the assembly in adjusted position automatically. The pivoted connections 12b, c, e, f, may be of the bolt and nut type but it is preferred to employ rivets and swage the ends over the required degree to afford a vibration proof connection that normally is non-movable but which will yield on manual urging for purposes of collapsing or extending the carrier.

To give lateral support to the sides when extended, cross-bow members 13, 13a, 13b are provided. Each is generally U-shaped, in plan, and are spaced from each other and form a substantially open front to the carrier and as well a series of spaced back supports for the medial portions of the bag of clubs. Each cross-bow except the one at the top is tension pivoted to the center pivots of opposite pairs of cross-arms and may be revolved slightly in opening or closing the carrier.

As previously indicated the upper cross-bow also provides an anchor for the draft handle 14. The handle 14 is pivoted to L-shaped brackets 14a secured to the cross-bow 13, as at 14b, and is locked in position by means of a wing nut 14c and arcuate slot connection 14d. The handle 14 extends forward and terminates in a hand gripping portion 14e. If desired, the handle may be made in sections, and coupled together as by a threaded coupling indicated at 14f.

The structure thus far described, forms in effect a three-sided carrier, the fourth side being formed by means of flexible straps 15, two of which are illustrated. Each strap is two ended with its center portion riveted or otherwise secured inside the cross-bow members and the free ends furnished with the conventional harness buckle or other suitable fastener.

In using the cart, the upper cross-bow is grasped and elevated relative to the base plate to the height required for a given bag of clubs, and released. The lazy-tong sides, by virtue of their pivots, retain their extended disposition automatically. The leg members are swung outwardly so as to rest on the floor or other surface, and the carrier stands upright alone. Thereafter, the bag is strapped in place, and with the handle assembled and adjusted angularly to a convenient position, the golfer is ready to draw his clubs about in substantially tireless manner.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, we claim as new and desire to secure the following combinations and elements or equivalents thereof by Letters Patent of the United States:

1. A mobile carrier for golf bags comprising a bag supporting base member provided with an upturned flange on either side, opposed side walls connected to said flanges, each wall comprising a multiplicity of crossed levers pivotally connected to each other and to the flanges of the base as to form lazy-tong side walls to the carrier, a U-shaped cross-bow member connecting the free ends of said lazy-tong side walls so as to form an opensided carrier; a draft handle connected to said cross-bow member medially of its ends, and means comprising a buckle strap secured to the ends of said cross-bow operable to close the open side of the carrier and whereby to secure a golf bag in the cavity defined by said lazy-tong side walls and cross-bow member.

2. The combination set forth in claim 1 in which said draft handle is normally fixed but adjustably pivoted to said cross-bow.

3. The combination set forth in claim 1 in which said draft handle is normally fixed but adjustably pivoted to said cross-bow and is sectionalized for convenience in storing the carrier when not in use.

4. A mobile carrier of the class described comprising a rectangular shaped aluminum base member provided with upturned flanges along opposite edges thereof, wheel elements journaled to said base on axes normal to the extent of the upturned flanges, side wall members pivotally mounted to said flanges, each of said side wall members comprising a system of crossed levers pivoted together so as to form a lazy-tong type of grill, U-shaped cross-bow members connecting the sidewall members at selected intervals whereby to form a back to the carrier, means comprising straps secured to selected ones of said cross-bow members for securing the article to be carried in the cavity defined by said grill sides and said cross-bows, and means operative to maintain said side wall members electively in extended or collapsed position.

5. The combination set forth in claim 4 in which the last mentioned means comprises preloaded friction discs interposed between adjacent faces of the pivoted levers of the side wall members.

6. The combination set forth in claim 4 in which one of the terminal levers of each side wall is pivoted to the flange of the base and the other terminal lever is pivoted to the flange of the base by means of a pin and slot connection.

7. A mobile carrier for golf bags comprising a bag supporting base member provided with an upturned flange on either side, opposed side walls connected to said flanges, each wall comprising a multiplicity of crossed levers pivotally connected to each other and to the flanges of the base as to form lazy-tong side walls to the carrier, friction discs interposed between the adjacent faces of said crossed levers so as to afford a plurality of semi-positive pivotal connections which in their aggregate afford self-sustaining sides to the carrier that are electively extensible and collapsible on manual urging, a U-shaped cross-bow member connecting the free ends of said lazy-tong side walls; a draft handle connected to said cross-bow member medially of its ends, and means comprising a buckle strap secured to the ends of said cross-bow for securing the bag in the cavity defined by said lazy-tong side walls and cross-bow member.

8. A mobile carrier comprising a rectangular shaped base member provided with upturned flanges along opposite edges thereof, wheel elements journaled to said base on axes normal to the extent of the upturned flanges, side wall members pivotally mounted to said flanges, each of said side wall members comprising a system of crossed levers pivoted together so as to form a lazy-tong type of grill, U-shaped cross-bow members connecting the side wall members at selected intervals whereby to form a back to the carrier, and means operative to maintain said side wall members electively in extended or collapsed position.

9. A mobile carrier comprising a base member provided with upturned flanges along opposite edges thereof, wheel elements journaled to said base on axes normal to the extent of the upturned flanges, side wall members pivotally mounted to said flanges, each of said side wall members comprising a system of crossed levers pivoted together so as to form a lazy-tong type of grill, U-shaped cross-bow members connecting the side wall members at selected intervals whereby to form a back to the carrier, and means operative to maintain said side wall members electively in extended or collapsed position.

MAX VOSSELER.
KARL STARZ.

REFERENCES CITED

The following references are of record in the file of this patent:

UNITED STATES PATENTS

| Number | Name | Date |
|---|---|---|
| 1,176,031 | Cady | Mar. 21, 1916 |
| 1,718,962 | Kimball | July 2, 1929 |

FOREIGN PATENTS

| Number | Country | Date |
|---|---|---|
| 810,833 | France | Jan. 6, 1937 |